United States Patent

[11] 3,592,532

| [72] | Inventor | Yorck Talbot, |
| | | Ebersstrasse 80, Berlin 62, Germany |
| [22] | Filed | Dec. 13, 1968, Ser. No. 783,777 |
| [45] | Patented | July 13, 1971 |
| [32] | Priority | Dec. 15, 1967 |
| [33] | | Germany |
| [31] | | P 16 55 466.8 |

| [54] | REAR VIEW MIRROR FOR VEHICLES |
| | 9 Claims, 2 Drawing Figs. |
| [52] | U.S. Cl. ............................................. 350/307 |
| [51] | Int. Cl. .............................................. G02b 5/08 |
| [50] | Field of Search ............................... 248/277, |
| | 281, 282; 350/288, 299, 303, 304, 305—307 |
| [56] | References Cited |
| | UNITED STATES PATENTS |
| 1,466,746 | 9/1923 | Ohlen ..................... 248/281 |
| 2,856,816 | 10/1958 | Ross ....................... 248/281 |

3,337,177   8/1967   Talbot............   350/307
FOREIGN PATENTS
794,962   1958   Great Britian.......   350/307

*Primary Examiner* — David Schonberg
*Assistant Examiner* — Michael J. Tokar
*Attorney* — Michael S. Striker ABSTRACT: A rear view mirror for mounting on the coachwork of a vehicle having a longitudinal axis. A base member is adapted to be mounted on the vehicle coachwork. An elongated mirror-head assembly is provided and has an axis. Mounting means mounts the mirror-head assembly on the base member for pivoting movement with reference to the latter in direction transversely of the longitudinal axis of the vehicle between a plurality of positions in each of which the axis of the mirror-head assembly is in parallelism with the longitudinal axis of the vehicle on whose coachwork the rear view mirror is mounted.

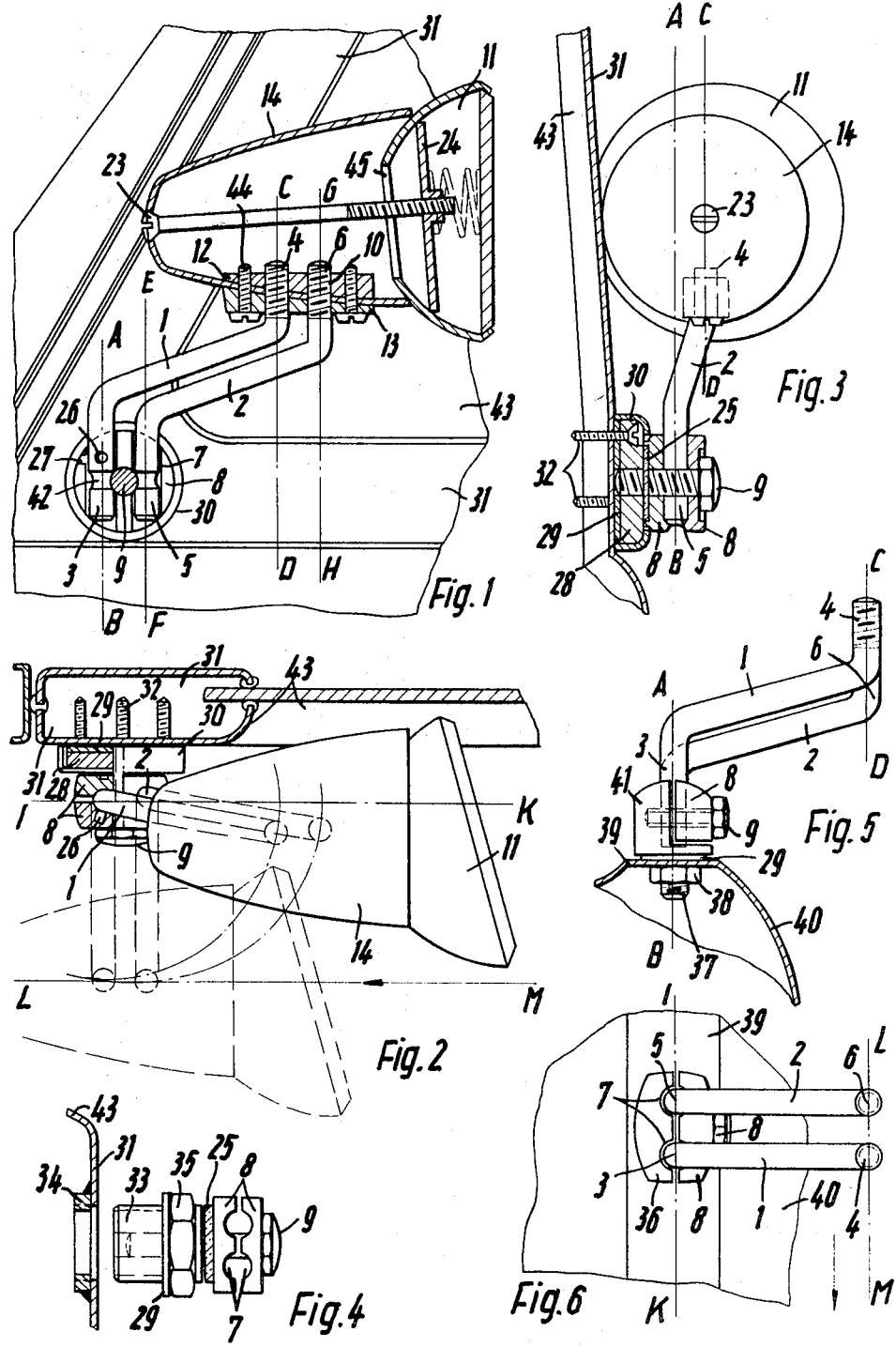

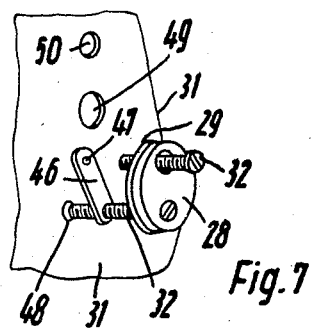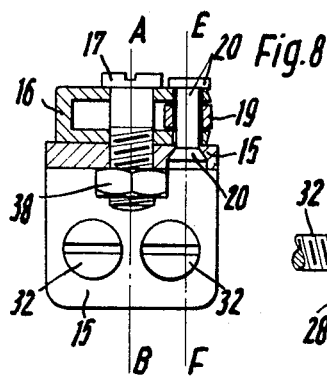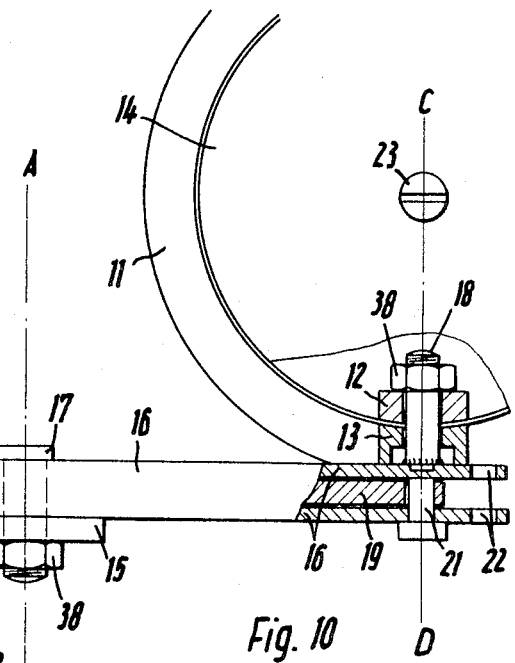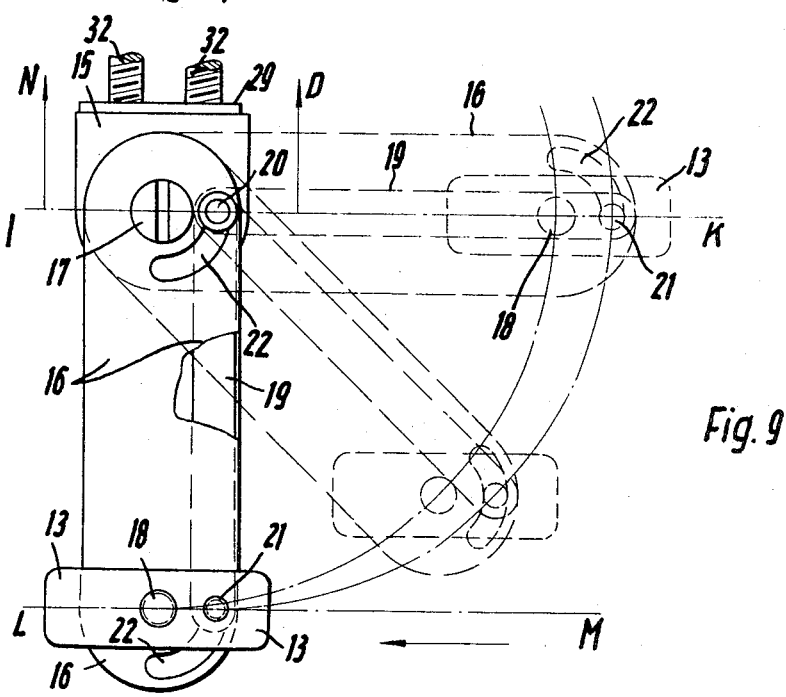
Inventor:
YORCK TALBOT 3,592,532

REAR VIEW MIRROR FOR VEHICLES

BACKGROUND OF THE INVENTION

The present invention relates generally to rear view mirrors for vehicles, and more particularly to adjustable rear view mirrors especially for automotive vehicles.

Because of an increase in concern for safety considerations, rear view mirrors are more and more being given streamlined configuration. Quite frequently they are rather long and elongated in the direction of elongation of the vehicle. They may be mounted on one of the front fenders or on one of the front doors of the vehicle. While the streamlined configuration of such mirrors has already significantly contributed to making collisions with these mirrors less dangerous, it is still clear that problems still exist in this respect. Thus, these mirrors generally extend laterally of the vehicle coachwork, that is laterally of the maximum width of the vehicle coachwork. If, now, it were to be possible to provide a rear view mirror which can be retracted or would undergo automatic retraction in response to collision with any person or any thing, this would constitute yet a further contribution towards improved safety.

SUMMARY OF THE INVENTION

It is, accordingly, an object of the present invention to provide such a rear view mirror.

More particularly, it is an object of the present invention to provide a rear view mirror of the type under discussion which, while it may normally extend laterally beyond the confines of the vehicle coachwork, will become retracted to within the confines of the vehicle coachwork in response to abutment against the person or an object.

In pursuance of the above objects, and others which will become apparent hereafter, one feature of my invention resides in providing a rear view mirror mounted on the coachwork of a vehicle having a longitudinal axis. The rear view mirror includes a base member which is adapted to be mounted on the vehicle coachwork and an elongated mirror-head assembly having an axis. Mounting means mounts the mirror-head assembly on the base member for pivoting movement with reference to the latter in direction transversely of the longitudinal axis of the vehicle between a plurality of positions in each of which the axis of the mirror-head assembly parallels the longitudinal axis of the vehicle.

In this manner, the movement of the mirror-head assembly is so controlled that any time during its retraction to within the confines of the vehicle coachwork in response to a collision, that longitudinal axis of the mirror-head assembly will always remain parallel to the longitudinal axis of the vehicle. This assures that the carefully configurated streamlined shape of the mirror-head assembly remains properly positioned with respect to the vehicle and remains capable at all times to fulfill its intended safety action. On the other hand, when the mirror-head assembly moves in this manner during retraction, it is a simple matter to subsequently restore it to its original preselected position without requiring new adjustment.

For purpose of the present invention, it is important that the desired movement is controlled by providing, in accordance with one embodiment of the invention a pair of mounting arms of substantially Z-shaped or zig-shaped configuration which extend in parallelism with one another and whose respective first end portions are mounted in the base member for turning movement about a first pair of parallel axes, spaced from one another by a predetermined distance, whereas their respective second end portions are spaced from the first end portions in the direction of the longitudinal axis of the vehicle and are mounted in the mirror-head assembly for turning movement about a second pair of parallel axes spaced from one another by this aforementioned predetermined distance and parallel to the first pair of axes. Of course, the actual mirror-head constituting a part of the mirror-head assembly will in conventional manner still be independently adjustable.

In accordance with another embodiment of the invention, the mounting means may be in the form of a hollow elongated first member whose first end portion is mounted on the base member for turning movement about a first axis and whose second end portion is connected with the mirror-head assembly for turning movement about a parallel second axis spaced from the first axis by a predetermined distance. The first member is provided with two cut-outs each of which corresponds to a segment of a circle and is concentric with one of these axes, and a second elongated member is slidably received in the first member and provided with a pair of pivots spaced from one another at the predetermined distance and each extending into and guided by one of the cut-outs.

Other novel features will be discussed in detail subsequently.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a sectional elevational view of a rear view mirror in accordance with one embodiment of the present invention, mounted on a vehicle coachwork;

FIG. 2 is a top-plan view of FIG. 1, with parts being shown in section;

FIG. 3 is a view of the embodiment in FIGS. 1 and 2 as seen from the left-hand side of these figures;

FIG. 4 is a detailed view illustrating a type of retracting arrangement for connecting the rear view mirror with the coachwork of the vehicle;

FIG. 5 illustrates in an elevational view, another type of connecting arrangement;

FIG. 6 is a plan view of FIG. 5;

FIG. 7 is a perspective detailed view of another type of connecting arrangement;

FIG. 8 is a partially sectioned side view of still a further type of connecting arrangement;

FIG. 9 illustrates a further embodiment of the invention in a top-plan view with alternate positions being illustrated in dash lines; and FIG. 10 is a view of the embodiments in FIGS. 8 and 9 with the mirror-head assembly installed and with parts broken away or shown in section, as seen from the front end of a vehicle.

DESCRIPTION OF THE PREFERRED EMBODIMENTS

Discussing now the drawing in detail, and firstly the embodiment illustrated in FIGS. 1–3 thereof, it will be seen that my novel rear view mirror in this particular embodiment comprises two pivoting and mounting arms 1 and 2. The first end portion 3 of the arm 1 and the second end portion 4 of the arm 1 have respective longitudinal axes A—B and C—D which extend in parallelism with one another. The same is true of the longitudinal axis E—F of the first end portion 5 of the arm 2 and the axis G—H of the second end portion 6 of the arm 2. The end portions 3 and 5 of the arms 1 and 2 are turnably received at a predetermined distance from one another in approximately semicircular grooves of a clamping member 8 constituting a base member for the mirror. Axial shifting of the end portions 3 and 5 with respect to the clamping member 8 is prevented by the circumferential recesses 42 provided in the end portions 3 and 5 and a central screw 9 extending intermediate the end portions 3 and 5 and projecting into the recesses 42 thereof as shown in FIG. 1. In an actual installation, a second clamping member 8 similar to the one illustrated, will be held by the screw 9 and pressed against the end portions 3 and 5 from the side opposite the other clamping member 8 so that the end portions 3 and 5 are held firmly but, after overcoming a certain frictional resistance turnably about their axes A-B and E-F respectively.

The second clamping member 8 has been omitted in FIG. 1 and it is clearly visible that a short pin 26 extends from the end portion 3 which, when the latter is turned to its position of use, will enter into a recess 27 provided on the inner clamping member 8. The inwardly directed surface of the other complementary clamping member 8 which has been omitted in the drawing, will be similarly provided with a recess into which the pin 26 will extend when the arm 1 turns in opposite direction. Thus, the arm 1 can be turned from its position of use, where it extends at right angles from the coachwork of the vehicle, inwardly by at most 90° until it is again prevented from further turning by entry of the pin 26 into the recess provided in the nonillustrated complementary clamping member 8.

The end portions 4 and 6 of the arms 1 and 2 extend through suitable apertures in a plate 13 and in the streamlined housing 14 of a mirror-head assembly. They are externally screw threaded, as shown, and are thus threaded into tapped bores 10 of an inner plate 12. Additionally, screws 44 are provided which serve to securely clamp the housing 14 between the plates 12 and 13.

In the embodiment of FIGS. 1-3 the housing 14 serves as an intermediate between the pivoting arm constituted by the arms 1 and 2 and the independently adjustable mirror-head 11 which in well-known manner is pivotably located in the rearwardly directed opening of the streamlined housing 14, and a long screw 23 being provided which extends through the hole 45 in the mirror-head 41 with the screw head being seated in the closed end of the housing 14 and with a centering disk 24 being located within the mirror-head 11 so that the latter can be adjusted independently of the positioning of the housing 14 via the pivoting arm constituted by the arms 1 and 2.

The end portions 4 and 6 are spaced from one another by the same distance as the end portions 3 and 5 are spaced from each other. For this reason, and since all the end portions have parallel axes, any movement of the novel rear view mirror must necessarily take place in the manner indicated in FIG. 2 wherein the mirror is shown in dotted lines in its normal operating position in which it projects outwardly beyond the coachwork of a vehicle, here assumed to be the door 31. The longitudinal axis L—M of the housing 14 in this position extends in parallelism with the longitudinal axes of the vehicle and also parallels the direction of movement of the vehicle indicated by the arrowhead. When the assembly is set in this position, the mirror-head 11 is adjusted independently of the position of the housing 14 and fixed in its selected most advantageous position by the screw 23 which is tightened. The line I—K denotes the common plane of the axes A—B and E—F.

If, now, any person or any thing collides or makes contact with the mirror-head assembly in the position of the latter shown in broken lines in FIG. 2, the arms 1 and 2 which together constitute a parallel motion cause the mirror-head assembly to move rearwardly (as seen with respect to the direction of movement of the vehicle) and inwardly towards the coachwork in such a manner that the longitudinal axis L—M of the housing 14 of the mirror-head assembly will remain in parallelism with the longitudinal axis of the vehicle and with the direction of movement of the latter. FIG. 2 shows in full lines the position of the rear view mirror prior to reaching the innermost position, that is the position in which it is retracted to the maximum possible extent. Of course, if the window recess 43 in the door 31 so permits, then the mirror may be inwardly pivoted still further until the longitudinal axis L—M of the housing 14 coincides with a center line through the socket constituted by the clamping members 8 and through the end portions 3 and 5. The arms 1 and 2 may for instance consist of steel and in this circumstance may be slightly springy in which case it may be possible to further inwardly move the rear view mirror by turning it about the upper end portions 4 and 6 to such an extent that the front of the housing 14, that is the one where the head of the screw 23 is located, will abut against the door 31. The rear view mirror will then be so close to the door and its streamlined form will be so positioned with reference to the door, that a person who may have been flung against the mirror as a result of collision will not be harmed and will rather simply slide over the streamlined surfaces of the mirror.

When the rear view mirror is to be returned to its position of use as illustrated in broken lines in FIG. 2, then it is simply necessary to push it outwardly whereupon it will automatically again reassume its preset position without requiring further adjustments.

FIG. 3 shows the assembly of FIGS. 1 and 2 as seen from the front of the vehicle and it will be seen that a flange portion 28 and a sealing gasket 29 are initially mounted on the door 31 of the vehicle by means of sheet metal or other screws 32 which are arranged substantially equally angularly spaced, whereupon the heads of these screws are covered with a cap 30. Thereupon, the end portions 3 and 5 are positioned between the two clamping members 8, which in FIG. 3 are both illustrated, and the screw 9 is passed through openings in the members 8 and through a lock washer 25 or the like, to be threaded into a tapped bore in the flange portion 28. The cap 30 may also be so configurated that it will cover not only the flange portion 28 but also the members 8, thus eliminating special polishing treatment for these members. In this case it is simply necessary to provide two additional openings in the cap 30 for the end portions 3 and 5 of the arms 1 and 2.

In the embodiment of FIG. 4, I have illustrated another type of connecting arrangement for connecting the rear view mirror to the vehicle coachwork. This is particularly simple and intended for use on such vehicles where the manufacturer welds or otherwise secures a threaded nut on the front door of his vehicle. The front door is now identified with reference numeral 31 and the nut 34 is shown to be welded to the inside of the front door in registry with an opening provided therein. The connecting arrangement comprises a hollow threaded screw 33 dimensioned so as to be threadedly engageable with the nut 34. A sealing gasket 29 is provided, and engagement surfaces 35 are provided on the screw 33. The screw 9 is threaded into the screw 33 and serves to hold the clamping members 8 and the lock washer 25 in place against the outer end face of the screw 33. In all other respects this embodiment is the same as the connecting arrangement shown in FIG. 3.

The embodiment in FIGS. 5 and 6 includes basically a rear view mirror of the type shown in FIGS. 1 and 2, that is utilizing the arms 1 and 2 with their various end portions. Here, the base member is configurated as a member 41 of substantially oval outline and substantially L-shaped cross section, as shown in FIG. 5. This embodiment is particularly suitable for mounting the rear view mirror on narrow edge portions of the vehicle coachwork, here assumed to be left front fender 40 or more particularly its longitudinally extending edge portion 39. One arm of the L-shaped member 41 is provided with a downwardly projecting screw threaded extension 37 and a nut 38, so that the member 41 can be mounted on the coachwork 40 by extending the extension 37 through a suitable aperture in the coachwork 40 and threading the nut 38 in place. The remainder of this embodiment, and its assembly, is the same as discussed with respect to FIGS. 1 and 2.

A further type of connection of the flange portion 28 with the vehicle coachwork, for example, the front door 31 thereof, is shown in FIG. 7. Here, two mounting screws 32 are provided in form of machine screws which are to be threaded into tapped bores 47 of a narrow strip-shaped member 46. One of the screws 32 is provided, once it has been threaded through the associated tapped bore 47 in the member 46, with an upset bead 48 at its end and is again threaded in reverse until the bead abuts against the underside of the member 46. This makes it impossible to inadvertently unthread this particular screw 32 from the member 46, and because of the firm abutment of the bead 48 against the underside of the member 46 it also prevents undesirable turning of the member 46 with reference to the screw 32, or vice versa. The reason for this is that before the mirror according to the present invention is installed on the vehicle coachwork, a hole 50 is provided in the coachwork 31 into which the second screw 32 is to be threaded, that is the one which is not provided with the bead 48. Some distance from the hole 50 is provided a larger hole 49 of such size that by holding onto the screw 32 provided with the bead 48, the member 46 can be inserted through this hole 49 to the inside of the coachwork 31 and can then be turned until the second tapped bore 47 registers with the hole 50 in the coachwork 31. Thereupon the second screw 32 is threaded toward the hole 50 into the second tapped bore 47. Tightening of both screws 32 compresses the sealing gasket 29 between the flange member 28 and the coachwork 31. Of course, a reversal of these steps permits removal of the flange member 28 from the coachwork 31. The upset bead 48 now prevents underside separation of the member 46 from the associated screw 32 and precludes that the member 46 can fall into the interior of the coachwork during assembly. This type of connecting the flange member 28 is particularly advantageous where the rear view mirror is to be mounted on coachwork consisting of weak or rather thin sheet metal which would not be sufficiently resistant to tightly hold the usual self-tapping sheet metal screws.

Coming, finally, to FIGS. 8, 9 and 10, it will be seen that they illustrate a further embodiment of the novel rear view mirror. Here, the arms 1 and 2 are replaced with a hollow member 16 which has an open side opened rearwardly, that is rearwardly with respect to the direction of movement of the vehicle. A flat member 19 consisting of steel or the like is received in the interior of the member 16 without play but movably and a rivet 20 as well as a screw 21 extending through the entire narrow thickness of the member 16, holds the member 19 in place. The member 16 is turnable about two pivots 17 and 18 and to make it possible for the rivet 20 and the screw 21 to perform the necessary quarter-circuit movement about the respective pivots 17 and 18, when such pivoting of the member 16 occurs. The member 16 is provided with arcuate slots 22 respectively concentric with the pivot axes 17 and 18. In these slots 22 the rivet 20 and the screw 21 are respectively guided and the ends of the slot serve as abutments to limit further movement.

To make it possible to move the arm consisting of the members 16 and 19 from its extended operating position through a full 90° to a retracted position, as discussed before, it is necessary to prevent that the pivot 18 can abut at the member 19 in the interior of the member 16 before the necessary angular movement has been ompleted. This is insured in simple manner by welding the screw 18 against the side of the member 16 where it can perform its intended function but does not extend into the interior of the member 16.

One end of the arm consisting of the members 16 and 19 is secured with the base member or socket rigidly constructed as an angular member 15 by the pivot 17 provided with a counter nut 38 as well as via the rivet 20. At the upper side and at the other end, the pivot 18 and nut 38 as well as the screw 21 which extends completely through the member 16, mount an apertured plate 13, the correspondingly apertured housing 14 and an inner apertured plate 12 movable without play. The mirror support 11 is connected with the housing 14 by the screw 23 in the manner already discussed. It is thus clear that the embodiment illustrated in FIGS. 8-10 is different from the embodiment previously discussed in the substitution of the members 16 and 19 for the arms 1 and 2 and in the different function found in this change. A further difference is the angularly configurated member 15. The movement of the rear view mirror from its extended retracted position in the manner already discussed in detail with respect to the preceding embodiments, however, is the same.

It will be appreciated that various changes may be made, and parts changed or substituted, without affecting the concept according to the present invention. Furthermore, whereas in FIGS. 1-6 I have illustrated a rear view mirror for the left-hand side of the vehicle, necessary changes can be made to adapt this mirror for the right-hand side of the vehicle without again affecting the invention. Thus, it is simply necessary to turn the arms 1 and 2 and the clamping members 8 through 180° to effect this change. To make such a mirror usable on either side of the vehicle, the clamping members 8 are advantageously provided not only with a single groove 7, as illustrated in FIG. 1, but with two mirror-reversed grooves. By contrast to the embodiment of FIGS. 1-6, the rear view mirror shown in FIGS. 8-9 can be used only at the left-hand side of the vehicle because of its isometric arm arrangement and would require, if it were to be used on the right-hand side of the vehicle, the construction of a special arm which would have to be made as a mirror-reversed replica of the one illustrated.

It will be understood that each of the elements described above, or two or more together, may also find a useful application in other types of constructions differing from the types described above.

While the invention has been illustrated and described as embodied in a rear view mirror of a vehicle, it is not intended to be limited to the details shown, since various modifications and structural changes may be made without departing in any way from the spirit of the present invention.

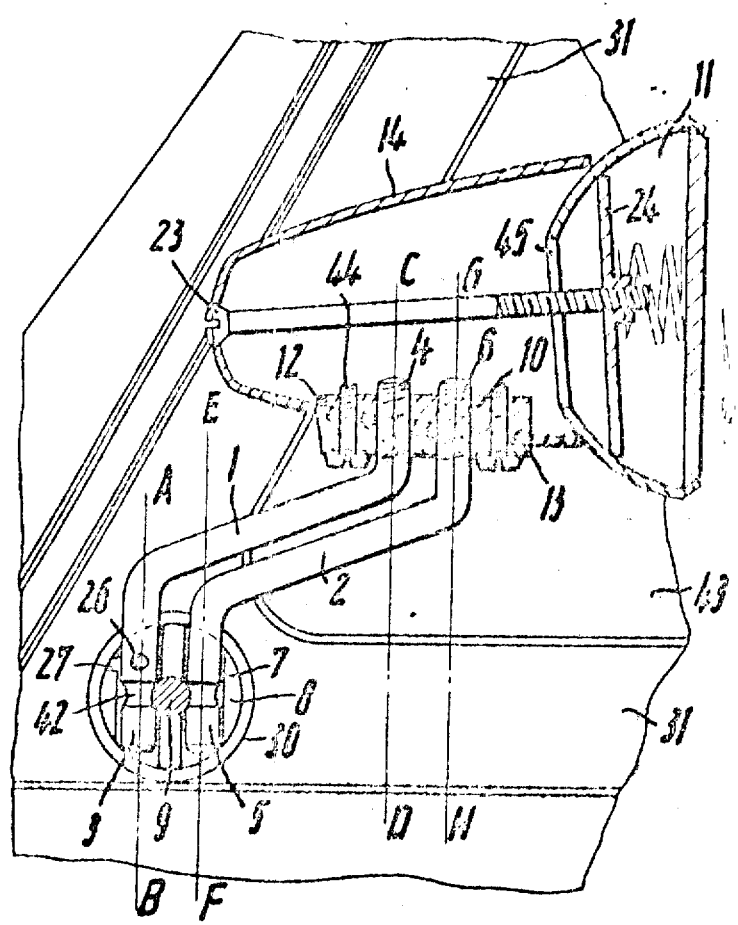

What is claimed as new and desired to be protected by Letters Patent is set forth in the appended claims:

1. A rear view mirror for mounting on the coachwork of a vehicle having a longitudinal axis, comprising a base member adapted to be mounted on the vehicle coachwork; an elongated mirror-head assembly having an axis paralleling said longitudinal axis and including a mirror member having a general plane extending transversely to both of said axes in predetermined orientation thereto; and mounting means mounting said mirror-head assembly on said base member for pivoting movement with reference to the latter in direction transversely of the longitudinal axis of the vehicle between a plurality of positions in each of which said axis of said mirror-head assembly parallels the longitudinal axis of the vehicle, and in each of which said general plane is displaced in strict parallelism with itself while said orientation remains unchanged, said mounting means comprising a pair of mounting arms having respective first end portions mounted in said base member for turning movement about a first pair of parallel axes spaced from one another by a predetermined distance, and having respective second end portions spaced from said first end portions in direction of the longitudinal axis of the vehicle and mounted in said mirror-head assembly for turning movement about a second pair of parallel axes spaced from one another lengthwise of said longitudinal axis by said predetermined distance and parallel to said first pair of axes.

2. A rear view mirror as defined in claim 1, said mounting means further comprising a hollow elongated first member having a first end portion mounted on said base member for turning movement about a first axis, and a second end portion connected with said mirror-head assembly for turning movement about a parallel second axis spaced from said first axis by a predetermined distance, said first member being provided with two cut-outs each corresponding to a segment of a circle and concentric with one of said axes, and a second elongated member slidably received in said first member and provided with a pair of pivots spaced at said predetermined distance and each extending into and guided by one of said cut-outs 3. A rear view mirror as defined in claim 1, said mirror-head assembly including an elongated housing having an opening facing away from the direction of forward movement of the vehicle, a mirror-head including said mirror member received in said opening, and adjustable means mounting said mirror head in said opening adjustably with reference to the central axis of said housing.

4. A rear view mirror as defined in claim 1, said base member comprising a supporting element mountable on coachwork and a pair of clamping elements having juxtaposed surfaces each provided with a pair of open grooves registering with corresponding grooves in the opposite surface, each of said first end portions being located between said surfaces in two registering grooves, and screw means connecting said clamping element with said supporting element and pressing them against each other for turnable adjustment and positioning at the will of a user.

5. A rear view mirror as defined in claim 4; further comprising screws connecting said supporting element with the coachwork of a vehicle, and cover means concealing said screws.

6. A rear view mirror as defined in claim 5; further comprising a reinforcing member having two opposite ends each provided with a screwhole, said screws comprising a first screw threaded into one of said screwholes and a second screw, and one end of said reinforcing member provided with the other screwhole extending from the outer side to the inner side of the vehicle coachwork with said other screwhole in alignment with an aperture in the coachwork, said second screw being threaded through said aperture into said other screwhole.

7. A rear view mirror as defined in claim 1, said base member comprising a pair of clamping elements having juxtaposed surfaces each provided with a pair of open grooves registering with corresponding grooves in the opposite surface, each of said first end portions being located between said surfaces in two registering grooves, and screw means connecting said clamping element with freedom of turnable adjustment and having a screw portion arranged to be threadbd into a mating element provided on the coachwork of a vehicle.

8. A rear view mirror as defined in claim 1, said base member being of substantially L-shaped cross-section and having a first arm connectable to the coachwork of a vehicle and a projecting second arm provided in one surface thereof with a first pair of open grooves; further comprising a clamping member having an abutment face overlying said one surface and provided with a second pair of open grooves each registering with a groove of said first pair to constitute therewith an elongated hollow in which one of said first end portions is turnably received; and screw means connecting said clamping member and said second arm for drawing the same together.

9. A rear view mirror as defined in claim 8, wherein said base member is of substantially oval outline.

UNITED STATES PATENT OFFICE
CERTIFICATE OF CORRECTION

Patent No. 3,592,532      Dated July 13, 1971

Inventor(s) YORCK TALBOT

It is certified that error appears in the above-identified patent and that said Letters Patent are hereby corrected as shown below:

Cancel the illustrative drawing on the cover sheet and substitute the drawing on the attached sheet.

Signed and sealed this 20th day of November 1973.

(SEAL)
Attest:

EDWARD M. FLETCHER, JR.
Attesting Officer

RENE D. TEGTMEYER
Acting Commissioner of Patents